Patented Oct. 2, 1951

2,569,747

UNITED STATES PATENT OFFICE 2,569,747

REACTION OF ALIPHATIC POLYHYDRIC ALCOHOLS AND CHLOROHYDRINS WITH $SiS_2$

James B. Culbertson, Lockport, Hendrik de W. Erasmus, Lewiston, and Robert M. Fowler, Niagara Falls, N. Y., assignors to Union Carbide and Carbon Corporation, a corporation of New York No Drawing. Application June 8, 1949, Serial No. 97,924

9 Claims. (Cl. 260—448.8)

This invention relates to a novel method for making silicates of alkylene polyhydric alcohols and chlorohydrins; and more particularly to a method for making ethylene, propylene, and butylene glycol silicates and chlorohydrin silicates, and for making glycerol silicate.

In accordance with the invention a silicate of an alkylene polyhydric alcohol or chlorohydrin, such as 1,2 ethylene, 1,2 propylene, or 1,3 butylene glycol or chlorohydrin, is prepared by reacting silicon disulfide ($SiS_2$) with such a polyhydric alcohol or chlorohydrin compound which is free from groups reactive with silicon disulfide, other than the hydroxyl groups. The glycol and chlorohydrin reactions proceed according to the following equations, wherein R is an alkylene radical $C_nH_{2n}$ in which $n$ is from 2 to 8:

$$2OH.R.OH + SiS_2 \rightarrow (O.R.O)_2Si + 2H_2S$$
$$4Cl.R.OH + SiS_2 \rightarrow (Cl.R.O)_4Si + 2H_2S$$

The reaction of the invention can be carried out with substantially pure silicon disulfide, or with silicon disulfide diluted with other materials. For example the so-called annealed silicon monosulfide, which is a mixture of silicon and silicon disulfide, has been used successfully. This is the product obtained by condensing silicon monosulfide vapor slowly, or by heating silicon monosulfide below its volatilization temperature until it changes into a mixture of silicon and silicon disulfide.

The following examples illustrate how the novel method can be performed:

Example 1

Annealed silicon monosulfide was added to a stoichiometric excess of ethylene glycol

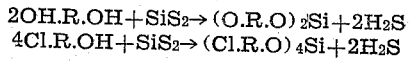
(OHCH$_2$CH$_2$OH)

contained in a reaction vessel at room temperature and atmospheric pressure. An exothermic reaction took place with the evolution of hydrogen sulfide which was removed, and a spongy solid mass of glycol silicate formed. The solid mass was dissolved in ethanol, filtered, and the excess of ethanol boiled off, whereupon the glycol silicate again set to a rigid mass. The product was soluble in alcohol and ethyl silicate, and contained 23.4% silicon.

Example 2

Ethylene glycol vapors were passed over silicon disulfide in a tube heated at 400° C. Glycol silicate was extracted from the residue in the tube by means of toluene.

Example 3

Annealed silicon monosulfide was added to a stoichiometric excess of ethylene chlorohydrin (ClCH$_2$CH$_2$OH) contained in a reaction vessel at room temperature. A fast reaction ensued and a solid mass was produced. The solid mass was distilled under a vacuum and the distilled product was found to contain about 9% silicon and about 41% chlorine, corresponding to the formula 
(ClCH$_2$CH$_2$O)$_4$Si.

Example 4

Silicon disulfide was added to a stoichiometric excess of glycerol contained in a reaction vessel at room temperature and atmospheric pressure, and the evolved hydrogen sulfide was removed. Glycerol silicate was obtained as the reaction product.

What is claimed is:

1. A method for making a silicate of a substance selected from the group consisting of aliphatic polyhydric alcohols and alkylene chlorohydrins, said substance being free from reactive groups other than hydroxyl, which method comprises reacting silicon disulfide with such a substance.

2. A method for making a silicate of a substance selected from the group consisting of aliphatic polyhydric alcohols and alkylene chlorohydrins, said substance being free from reactive groups other than hydroxyl, which method comprises reacting one mol of silicon disulfide with at least two mols of such a substance, and removing hydrogen sulfide generated during the reaction.

3. A method for making ethylene glycol silicate which comprises reacting silicon disulfide with ethylene glycol.

4. A method for making propylene glycol silicate which comprises reacting silicon disulfide with propylene glycol.

5. A method for making butylene glycol silicate which comprises reacting silicon disulfide with butylene glycol.

6. A method for making ethylene chlorohydrin silicate which comprises reacting silicon disulfide with ethylene chlorohydrin.

7. A method for making glycerol silicate which comprises reacting silicon disulfide with glycerol.

8. A method for making a silicate of a substance selected from the group consisting of alkylene dihydric alcohols and alkylene chlorohydrins, said substance being free from reactive groups other than hydroxyl, which method comprises reacting silicon disulfide with such a substance.

9. A method for making a silicate of an alkylene glycol free from reactive groups other than hydroxyl, which comprises reacting silicon disulfide with such an alkylene glycol.

JAMES B. CULBERTSON.
HENDRIK DE W. ERASMUS.
ROBERT M. FOWLER.

REFERENCES CITED

The following references are of record in the file of this patent:

UNITED STATES PATENTS

| Number | Name | Date |
|---|---|---|
| 2,381,137 | Patnode | Aug. 7, 1945 |

FOREIGN PATENTS

| Number | Country | Date |
|---|---|---|
| 436,808 | Italy | June 14, 1948 |

OTHER REFERENCES

Fremy "Annales de Chimie et de Physique," 3rd Series, vol. 38 (1853) page 318.

Taurke Berichte der Beut. Chem. Ges., vol. 38, (1905) pages 1661–1670.

Malatesta Gazz. Chim. Ital., vol. 78 (1948) pages 753–63.